United States Patent [19]
Sato et al.

[11] Patent Number: 5,621,300
[45] Date of Patent: Apr. 15, 1997

[54] CHARGING CONTROL METHOD AND APPARATUS FOR POWER GENERATION SYSTEM

[75] Inventors: Hiroshi Sato; Kimitoshi Fukae, both of Nara; Nobuyoshi Takehara, Kyoto, all of Japan

[73] Assignee: Canon Kabushiki Kaisha, Tokyo, Japan

[21] Appl. No.: 429,227

[22] Filed: Apr. 25, 1995

[30] Foreign Application Priority Data

Apr. 28, 1994 [JP] Japan ................................. 6-092755

[51] Int. Cl.$^6$ ............................. H02J 7/00; H01M 10/44; H01M 10/46
[52] U.S. Cl. .................................... 320/5; 320/9; 320/14; 320/21
[58] Field of Search ............................ 320/5, 10, 11, 320/12, 14, 21, 39, 9

[56] References Cited

U.S. PATENT DOCUMENTS

| | | | |
|---|---|---|---|
| 4,695,785 | 9/1987 | Mieth et al. | 323/222 |
| 5,025,202 | 6/1991 | Ishii et al. | 320/14 |
| 5,467,008 | 11/1995 | Uchinami | 320/12 |

Primary Examiner—Peter S. Wong
Assistant Examiner—Patrick B. Law
Attorney, Agent, or Firm—Fitzpatrick, Cella, Harper & Scinto

[57] ABSTRACT

In a charging control method and apparatus which can improve the operating efficiency of a power generation system and prolong the service life of an accumulation unit, a short-circuit switch is closed, and a current generated in a solar cell is charged in the accumulation unit in a charging state. With this charging, the terminal voltage of the accumulation unit rises. This voltage is detected by a detection unit and is loaded into a control unit. When the detected voltage rises to a predetermined voltage, the short-circuit switch is closed by a short-circuit control signal. The output current from the solar cell is then discharged to the ground, and charging is stopped. In this state, the control unit determines the connected state of a load from an output signal from the detection unit. When the closed state of the short-circuit switch is determined from an output signal from a detection unit, the control unit switches the short-circuit switch to an open state even if the voltage of the accumulation unit has not reached a charging start voltage. With this switching operation, discharging of an output current from the solar cell to the ground is stopped, and the output current from the solar cell is output to the accumulation unit and the load.

7 Claims, 5 Drawing Sheets

FIG. 3
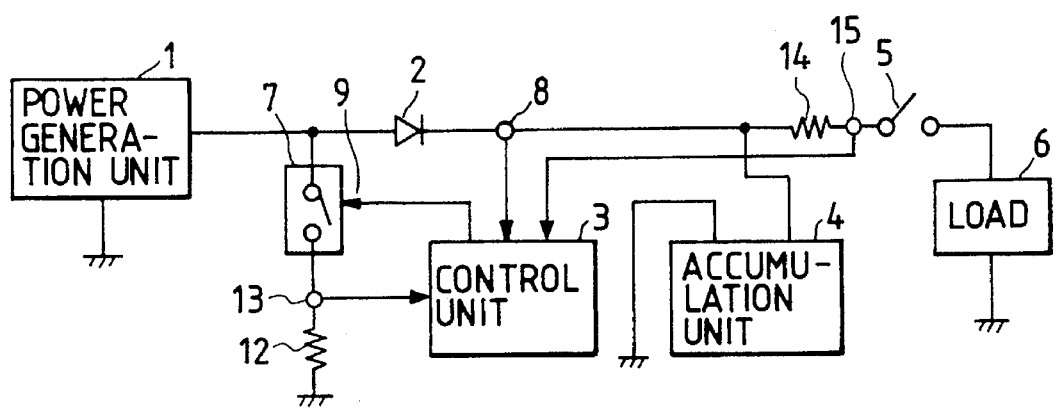
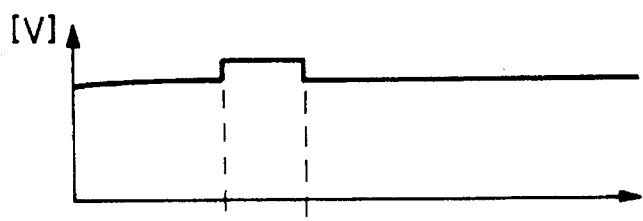
FIG. 4A
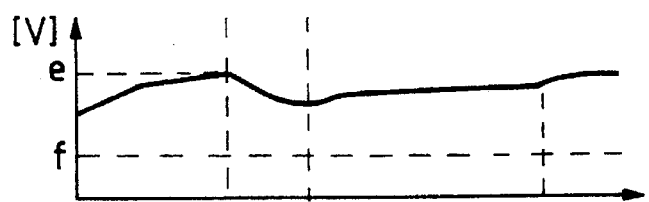
FIG. 4B
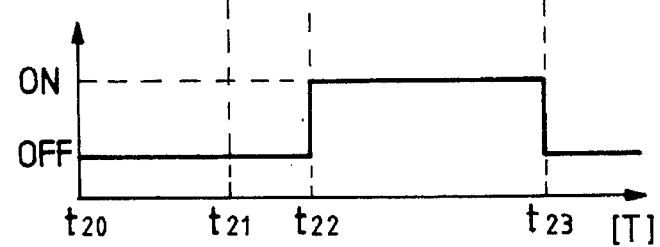
FIG. 4C

FIG. 5
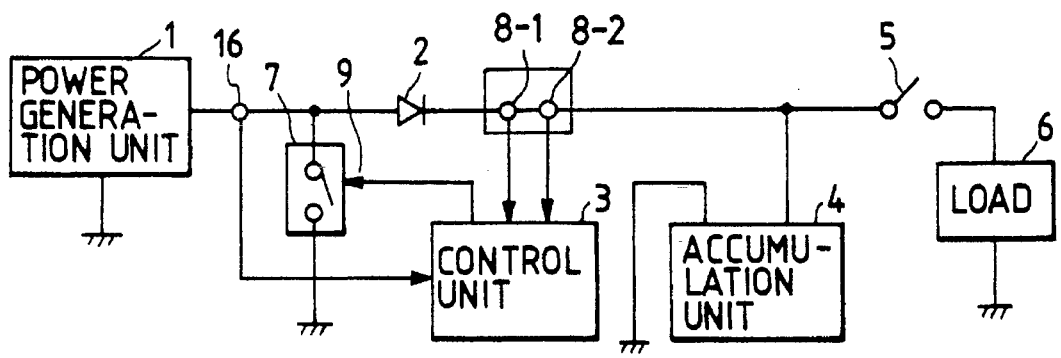
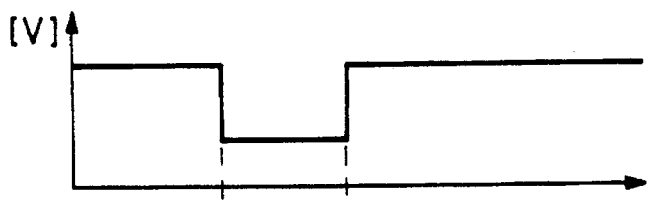
FIG. 6A
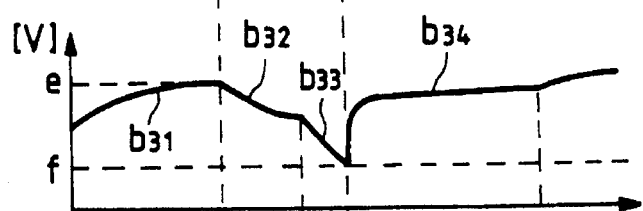
FIG. 6B
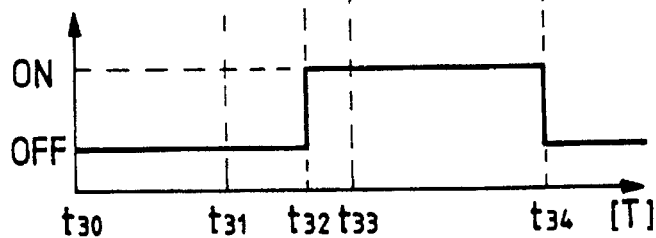
FIG. 6C

CHARGING CONTROL METHOD AND APPARATUS FOR POWER GENERATION SYSTEM

BACKGROUND OF THE INVENTION

1. Field of the Invention

The present invention relates to a charging control method and apparatus for a power generation system and, more particularly, to a charging control method and apparatus for a power generation system used together with a DC power source having an unstable output and an accumulation cell for stabilizing the unstable DC power source.

2. Related Background Art

FIG. 9 shows the circuit arrangement of a charging control apparatus for a power generation system. Referring to FIG. 9, the apparatus includes a solar cell 41 as an unstable power source, a reverse current prevention diode 42, a control unit 43, an accumulation cell 44, a load connection switch 45 (or element), a load 46, an overcharging prevention short-circuit switch (or element) 47, which is opened/closed by the control unit 43, and a detection unit 48 for detecting an output voltage from the accumulation cell 44. A short-circuit control signal 49 is input from the control unit 43. A detection signal based on the terminal voltage of the accumulation cell 44 which is detected by the detection unit 48 is input to the control unit 43.

FIGS. 10A, 10B, and 10C are timing charts showing the operation of the apparatus shown in FIG. 9. FIG. 10A shows an output current from the solar cell; FIG. 10B, the terminal voltage of the accumulation cell; and FIG. 10C, the connected state of the load. In these charts, a voltage e is a predetermined voltage at which a charging operation is inhibited, and a voltage f is a predetermined voltage at which a charging operation is permitted. In the timing charts, time $t_{41}$ is the time at which the terminal voltage reaches the predetermined voltage e, i.e., the time at which inhibition of charging is started; time $t_{42}$, the time at which load connection is started; $t_{43}$, the time at which the terminal voltage reaches the predetermined voltage f, i.e., the time at which inhibition of charging is canceled; and time $t_{44}$, the time at which load connection is canceled.

Referring to FIG. 9, the solar cell 41 receives sunlight and generates an electromotive force to output a current. The current output from the solar cell 41 is stored in the accumulation cell 44 via the reverse current prevention diode 42. It is assumed in this case that the overcharging prevention short-circuit switch (or element) 47 is closed by the short-circuit control signal 49 from the control unit 43. Assume that this state corresponds to the state at recording start time $t_{40}$ in FIGS. 10A to 10C. In this case, the accumulation cell 44 is in a charging state, and the terminal voltage of the accumulation cell 44 rises with the lapse of time. This state corresponds to a curve $b_{41}$ in FIG. 10B.

This voltage is detected by the detection unit 48, and the resultant detection signal is loaded into the control unit 43. At time $t_{41}$ at which a voltage b of the accumulation cell 44 rises, owing to a charging operation, to the predetermined voltage e at which the charging operation must be terminated, a short-circuit control signal 49 is output from the control unit 43 to close the short-circuit switch (or element) 47 for preventing an overcharging operation. When the short-circuit switch (or element) 47 is closed, the output of the solar cell 41 is grounded, and the output current from the solar cell 41 is discharged to the ground. As a result, charging of the accumulation cell 44 is stopped.

A curve $b_{42}$ in FIG. 10B represents a voltage drop due to self-discharging; and a curve $b_{43}$, a voltage drop due to discharging to the load 46. In this background art, the condition for permitting a charging operation again is that the terminal voltage of the accumulation cell 44 drops to the predetermined voltage f. This predetermined voltage f is set to be a value lower than the above-mentioned predetermined voltage e corresponding to the characteristics of the accumulation cell 44 used or the like. In addition, the predetermined value f is selectively set in consideration of prevention of oscillation of a control system circuit for preventing an overcharging operation. Therefore, when the terminal voltage of the accumulation cell 44, whose charging operation is inhibited, is set between the predetermined voltage e and the predetermined voltage f, even if the load 46 is connected, all the output currents from the solar cell 41 are discharged to the ground via the overcharging prevention short-circuit switch (or element) 47. The above background art has the following problems.

(1) When a charging operation is inhibited, even if extra currents are generated by the solar cell 41, all such extra currents are discharged to the ground, and the power generated by the solar cell 41 is not effectively used.

(2) When charging of the accumulation cell 44 is inhibited, and the load 46 is connected, since only power from the accumulation cell 44 is supplied to the load, an unnecessary discharging operation is performed. This unnecessary discharging operation reduces the warranted non-charging period in number of days of the system, thus shortening the service life of the accumulation cell 44.

SUMMARY OF THE INVENTION

It is an object of the present invention to provide a charging control method and apparatus which can improve the operating efficiency of a power generation system and prolong the service life of an accumulation cell.

In order to achieve the above objects, according to the present invention, there is provided a charging control apparatus for a power generation system, which controls accumulation means, connected between power generation means and an output terminal thereof, for accumulating power output from the output terminal, and charging of the accumulation means, comprising first detection means for detecting a terminal voltage of the accumulation means and outputting a first detection signal, second detection means for detecting connection/non-connection between the output terminal and a load and outputting a second detection signal, connection means for electrically connecting power from the power generation means to the accumulation means and the load, and control means for receiving at least the first and second detection signals, and ON/OFF-controlling the connection means, thereby controlling charging of the accumulation means which is performed by power from the power generation unit.

In addition, the control means detects a terminal voltage of the accumulation means and connection/non-connection between the load and the output terminal from the first detection signal, and controls charging of the accumulation means, which is performed by power from the power generation means, in accordance with a connected/non-connected state of the load, under different conditions, thereby improving the overall efficiency of the system.

Furthermore, the power generation means is preferably a solar cell whose installation place can be selected relatively freely.

Moreover, the charging control apparatus for the power generation system includes third detection means for detecting a current value of power generated by the power generation means, and fourth detection means for detecting a value of a load current flowing in the load, and uses the magnitudes of the current value of the power and the value of the load current as criteria for performing charging control of the accumulation means.

Therefore, in the charging control apparatus for the power generation system according to the present invention, the terminal voltage of the accumulation means and connection/non-connection between the output terminal and the load are detected, and the control means controls charging of the accumulation means, which is performed by power from the power generation means, on the basis of the resultant detection signals. Therefore, the control means can detect not only the terminal voltage of the accumulation means but also the connected/non-connected state of the load, and can use the detection signals for charging control of the accumulation means.

In addition, charging of the accumulation means, which is performed by power generated by the power generation means, can be controlled under different conditions depending on the connected/non-connected state of the load.

BRIEF DESCRIPTION OF THE DRAWINGS

FIG. 3 is a schematic view showing the circuit arrangement of another charging control apparatus for a power generation system according to the present invention;

FIGS. 4A, 4B, and 4C are timing charts for explaining the operation of the charging control apparatus in FIGS. 2A, 2B and FIG. 5 is a schematic view showing the circuit arrangement of still another charging control apparatus for a power generation system according to the present invention;

FIGS. 6A, 6B, and 6C are timing charts for explaining the operation of the charging control apparatus in FIG. 5;

DETAILED DESCRIPTION OF THE PREFERRED EMBODIMENTS

Figure 1:
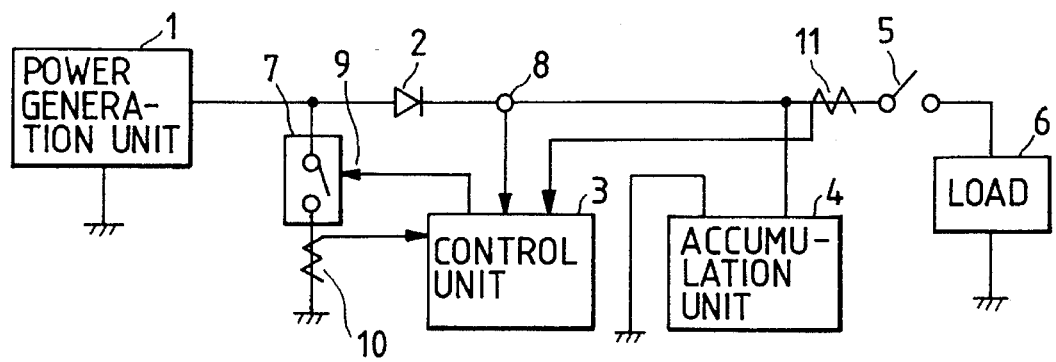
FIG. 1 is a schematic view showing the circuit arrangement of a charging control apparatus for a power generation system according to the present invention.

The present invention will be described in detail below with reference to the accompanying drawings.

The same reference numerals denote the same means having the same functions throughout the drawings.

Generation Unit 1

As a generation unit, a solar cell, whose installation place can be selected relatively freely, is preferably used. However, for example, the present invention can be applied to a power generation unit using solar heat, terrestrial heat, wind force, tidal force, or water power. Also, the present invention can be applied to a fuel cell or the like to improve the reliability. Of solar cells, especially a cell using amorphous silicon (including a small crystal in this case) or a non-monocrystalline semiconductor such as a polycrystalline semiconductor is preferably used for the following reason. With the use of such a material, the solar cell, which allows an increase in area more easily than a cell using a polycrystalline semiconductor but has a low conversion efficiency, can contribute to improve the overall efficiency of the system.

Reverse Current Prevention Unit 2

As a reverse current prevention unit, a diode is used. However, a combination of a diode and other elements may be used, as needed, as long as a reverse current can be prevented.

Control Unit 3

A control unit serves to receive a signal from a detection unit and output a control signal. The control unit can be constituted by a one-chip microcomputer and the like.

Accumulation Unit 4

As an accumulation unit, a unit for accumulating power from the generation unit is preferably used. For example, a lead accumulation cell, a nickel-hydrogen cell, a lithium cell, or a lithium ion cell may be used.

Connection Unit 5

As a connection unit, a mechanical switch, a semiconductor element, or the like as a connection switch is used.

Load 6

A load is properly set in accordance with an application purpose. For example, an accumulation unit or commercial use system different from the accumulation unit 4 may be used.

Short-circuit Switch 7

A short-circuit switch as a connection unit for controlling connection between the generation unit, the accumulation unit, and the load is preferably constituted by a semiconductor element.

Detection Units 8, 10, 11, 13, 15, and 16

As detection units, any units capable of detecting the amount of power generated by the generation unit, the amount of current accumulated in the accumulation unit, the connected/non-connected state of the load, the open/closed state of the short-circuit switch, and the like and outputting the detection signals to the control unit can be used. Ammeters, voltmeters, and the like are used.

First Embodiment

FIG. 1 shows the schematic circuit arrangement of the present invention. Referring to FIG. 1, a power generation unit 1 is a solar cell or the like as a power generation device whose output power is unstable. A diode 2 serves to prevent a reverse flow of an output current from the power generation unit 1. A control unit 3 controls the overall power generation system to execute a smooth, safe, and efficient charging operation. The control unit 3 has arithmetic elements (no shown in detail) such as a CPU. The control unit 3 receives a voltage detection signal from a detection unit 8, a short-circuit current signal from a detection unit 10, and a load current signal from a detection unit 11, and outputs a short-circuit control signal 9 upon arithmetic processing based on a predetermined procedure.

An accumulation unit 4 is a secondary cell or the like for charging/discharging electric energy to stabilize unstable power from the power generation device and improve the efficiency of the power generation system. A connection switch (or, e.g., a semiconductor element) 5 is for connecting/disconnecting the power generation system to/from a load 6. An overcharging prevention switch 7 is a short-circuit switch for disconnecting the accumulation unit from the power generation unit. Referring to FIG. 1, the short-circuit switch 7 is arranged between the power output terminal of the power generation device and ground. As the short-circuit switch 7, a switch (or, e.g., a semiconductor element) is used. The opening/closing operation of this overcharging prevention switch 7 is executed on the basis of the short-circuit control signal 9 from the control unit 3.

The terminal voltage detection unit (to be simply referred to as the detection unit in some case hereinafter) 8 detects the terminal voltage of the accumulation unit 4 and outputs a detection signal. The short-circuit detection unit (to be simply referred to as the detection unit in some case hereinafter) 10 detects a short-circuit current from the solar cell 1. The short-circuit detection unit 10 detects the magnitude of a current discharged from the solar cell 1 to the ground while the overcharging prevention short-circuit switch 7 is closed, and outputs the resultant detection signal.

The current detection unit (to be simply referred to as the detection unit in some case hereinafter) 11 detects a current output to the load 6. All output signals from the detection units 11, 8, and 10 are input to the control unit 3.

The operation of the charging control apparatus for the power generation system, which has the above circuit arrangement, will be described with reference to the timing charts shown in FIGS. 2A, 2B, and 2C.

Figure 2A:
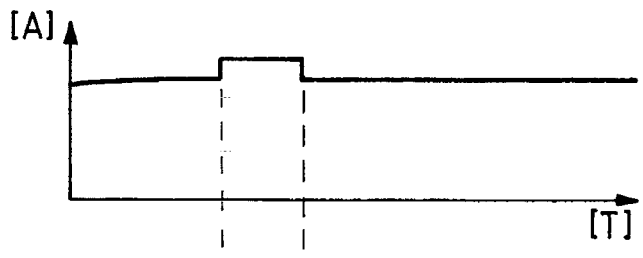
FIGS. 2A, 2B, and 2C are timing charts for explaining the operation of the charging control apparatus in FIG. 1.
Figure 2B:
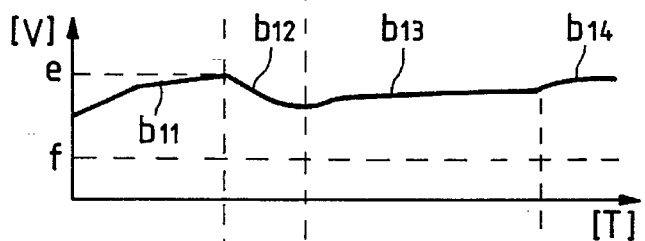
Figure 2C:
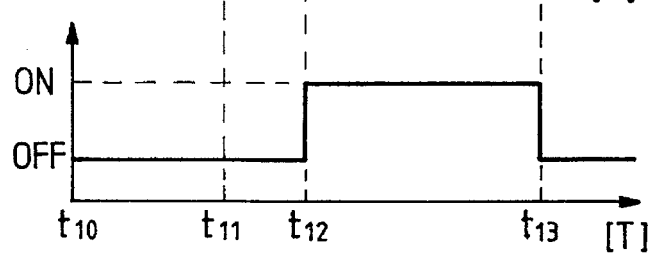
Figure 10A:
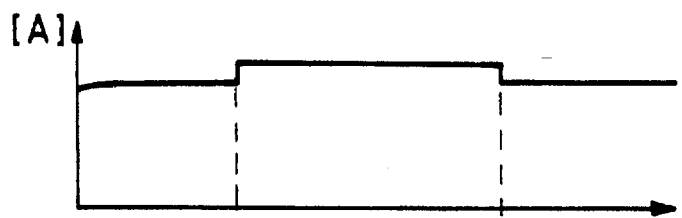
FIGS. 10A, 10B, and 10C are timing charts for explaining the operation of the charging control apparatus in FIG. 9.
Figure 10B:
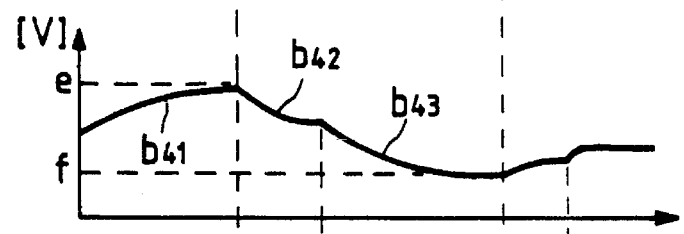
Figure 10C:
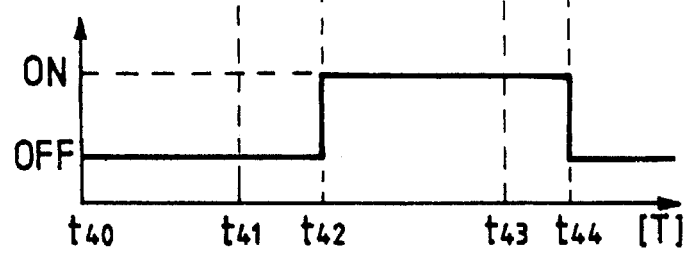

FIGS. 2A, 2B, and 2C are charts respectively showing an output current from the solar cell 1 as the power generation unit, an output voltage from the accumulation unit, and the connected state of the load 6. FIGS. 10A, 10B, and 10C show timings along the same time base, with the abscissas representing time, and the ordinates respectively representing the current, the voltage, and the connected state.

Referring to FIGS. 10A, 10B, and 10C, a voltage e is a predetermined voltage at which charging of the accumulation unit 4 is inhibited, and a voltage f is a predetermined voltage at which charging of the accumulation unit 4 is permitted. In these timing charts, time $t_{11}$ is the time at which the output voltage reaches the predetermined voltage e at which a charging operation is inhibited; time $t_{12}$, the time at which connection of the load 6 is started; and time $t_{13}$, the time at which connection of the load 6 is canceled.

Referring to FIG. 1, when the solar cell 1 receives light energy such as sunlight, an electromotive force is generated in the solar cell 1 to output a current. The output current is accumulated in the accumulation unit 4 as the accumulation unit via the diode 2 as the reverse current prevention unit. At this time, the short-circuit control signal 9 from the control unit 3 as a control means serves to close the overcharging prevention short-circuit switch 7.

Assume that this state corresponds to recording start time $t_{10}$ in FIGS. 2A, 2B, and 2C. In this case, a terminal voltage $b_{11}$ of the accumulation unit 4 in a charged state rises with the lapse of time. The terminal voltage $b_{11}$ is detected by the detection unit 8 for detecting an accumulation cell voltage, and the detection signal is loaded into the control unit 3. When the terminal voltage $b_{11}$ of the accumulation unit 4 rises to the predetermined voltage e at which the charging operation must be terminated, the control unit 3 outputs a short-circuit control signal 9 to close the short-circuit switch 7 at time $t_{11}$.

After time $t_{11}$, since the output terminal of the solar cell 1 is grounded via the overcharging prevention short-circuit switch 7, the output current from the solar cell 1 is discharged to the ground, and charging of the accumulation unit 4 is stopped. In this state, a voltage $b_{12}$ of the accumulation unit 4 drops owing to self-discharging, as shown in FIG. 2B, even if the load 6 is not connected.

At time $t_{12}$ after time $t_{11}$ at which the above self-discharging is started, the power generation system and the load 6 are connected to each other via the connection switch 5. This connected/non-connected state is detected by the detection unit 11, and the resultant detection signal is output to the control unit 3.

The control unit 3 receives the output signal from the current detection unit 11 as the current detection unit to determine that the load 6 is in a connected state. In addition, the control unit 3 determines, from an output signal from the short-circuit detection unit 10 as the short-circuit current detection unit, that the short-circuit switch 7 is in a closed state, and outputs a short-circuit control signal 9 to switch the short-circuit switch 7 to an open state. With this switching of the short-circuit switch 7, the discharging of the output current from the solar cell 1, which has been continued until time $t_{12}$, is stopped.

After time $t_{12}$, the output current from the solar cell 1 passes through the diode 2 to be output to the accumulation unit 4 and the load 6. Therefore, discharging to the load 6 is performed while the solar cell 1 and the accumulation unit 4 are connected in parallel. In this case, the discharging operation of the accumulation unit 4 is stopped, and a drop in the terminal voltage $b_{13}$ of the accumulation unit 4 is stopped or suppressed, although it depends on the consumption power of the load 6.

At time $t_{13}$, the connection switch 5 is opened, and the load 6 is disconnected. Since the charging operation is continued, a terminal voltage $b_{14}$ of the accumulation unit 4 rises. The terminal voltage $b_{14}$ of the accumulation unit 4 is detected by the detection unit 8, and the charging operation is continued until the terminal voltage reaches the predetermined voltage e at which charging is inhibited.

There are two conditions for resuming the charging operation: (a) connection of the load 6, and (b) a drop in the terminal voltage of the accumulation unit 4 to the predetermined voltage f. Although not shown in FIG. 2, when the detection unit 8 detects that the terminal voltage of the accumulation unit 4 has reached the voltage f owing to self-discharging or the like with the load 6 being in a disconnected state, the short-circuit switch 7 is opened to set the accumulation unit 4 in a charged state.

Second Embodiment

FIG. 3 shows another circuit arrangement as the second embodiment of the present invention. The same reference numerals in FIG. 3 denote the same parts as in FIG. 1. The second embodiment comprises a solar cell 1, a diode 2, a control unit 3, an accumulation unit 4, a connection switch 5, a load 6, a short-circuit switch 7, and detection units 12, 13, and 15. This embodiment also uses a short-circuit control signal 9.

A discharge current detection unit 12 is a resistor for detecting a discharge current. The resistor 12 serves to detect an output current discharged from the solar cell 1 to the ground via the short-circuit switch 7. A voltage detection unit (to be simply referred to as a detection unit in some case hereinafter) 13 detects a voltage generated by the resistor 12. A detection signal from the detection unit 13 is output to the control unit 3. A resistor 14 serves to convert a current, supplied to the load 6, into a voltage and detect the voltage. A detection unit 15 detects a voltage applied to the load, and the resultant detection signal is input to the control unit 3.

In the above arrangement, the resistance of the resistor 12 and the value of the voltage detected by the detection unit 13 correspond to the current detection signal obtained by the detection unit 10 in the first embodiment. The resistance of the resistor 14 and the value of the voltage across the resistor 14 which is detected by the detection units 8 and 15 correspond to the current detection signal obtained by the detection unit 11 in the first embodiment. Note that current values are measured by using resistors according to the Ohm's law.

The operation of the charging control apparatus for the power generation system, which has the above circuit arrangement, is clarified by the timing charts shown in FIGS. 4A, 4B, and 4C.

FIGS. 4A, 4B, and 4C respectively show the voltage of the resistor 12 for detecting a short-circuit current from the solar cell 1, the voltage of the accumulation cell, and the voltage (difference from the cell voltage) of the resistor 14 for detecting an output current, respectively. The operation based on these signals is basically the same as that of the first embodiment. Time $t_{10}$ to time $t_{13}$ respectively correspond to time $t_{20}$ to time $t_{23}$.

The devices or elements used as the ammeters in the first embodiment to directly measure currents are generally expensive. The use of such ammeters is not suitable for designing an inexpensive charging control apparatus. It is the object of the second embodiment to realize an inexpensive charging control apparatus.

Third Embodiment

FIG. 5 shows still another circuit arrangement of the present invention. The same reference numerals in FIG. 5 denote the same parts as in FIG. 1. The third embodiment comprises a solar cell 1, a diode 2, a control unit 3, an accumulation unit 4, a connection switch 5, a load 6, a short-circuit switch 7, and a terminal voltage detection unit 8. This embodiment also uses a short-circuit control signal 9. A detection unit 16 detects an output voltage from the solar cell 1 as a power generation unit, and the detection signal is input to the control unit 3.

FIGS. 6A, 6B, and 6C are timing charts showing the operation of the apparatus in FIG. 5. FIGS. 6A, 6B, and 6C respectively show the output voltage from the solar cell 1 as the power generation unit, the terminal voltage of the accumulation unit 4 as an accumulation means, and the connected state of the load 6. In these timing charts, time $t_{31}$ is the time at which the terminal voltage reaches a predetermined voltage e; time $t_{32}$, the time at which connection of the load 6 is started; and $t_{34}$, the time at which connection of the load 6 is canceled.

Referring to FIG. 5, when the solar cell 1 receives light energy such as sunlight, an electromotive force is generated to output a current. The output current is accumulated in the accumulation unit 4 via the reverse current prevention diode 2. At this time, the short-circuit control signal 9 output from the control unit 3 serves to set the overcharging prevention short-circuit switch 7 in an open state.

Assume that this state corresponds to recording start time $t_{30}$ in FIGS. 6A, 6B, and 6C. In this case, the accumulation unit 4 is charged with the lapse of time, and a terminal voltage $b_{31}$ of the accumulation unit 4 rises. This voltage is loaded into the control unit 3 by the accumulation cell voltage detection unit 8. When the voltage rises to a predetermined voltage e, the control unit 3 outputs a short-circuit control signal 9 to open the overcharging prevention short-circuit switch 7. This timing corresponds to time $t_{31}$ in FIGS. 6A, 6B, and 6C.

After time $t_{31}$, charging to the accumulation unit 4 is stopped, and voltages $b_{32}$ and $b_{33}$ of the accumulation unit 4 drop, as shown in FIG. 6B. In the third embodiment, the terminal voltages of the accumulation unit 4 are sequentially loaded into the control unit 3 by the terminal voltage detection unit 8-1 and 8-2. Upon detection unit 8-2 showing of a considerable drop in voltage, the control unit 3 detects the connected/non-connected state of the load. In addition, upon reception of an output signal from the detection unit 16 for detecting an output voltage from the solar cell 1, the control unit 3 detects the short-circuited state of the solar cell 1. Assume that the control unit 3 detects whether an output current from the solar cell 1 is short-circuited. Also assume that the load is connected, and the output current from the solar cell 1 is short-circuited to ground. In this case, the inhibition of charging is immediately canceled, and charging of the accumulation unit 4 by power generated by the solar cell 1 is resumed.

With this simple current detection circuit, the cost of apparatus can be reduced. In addition, with omission of a current detection resistor, the loss of power through the resistor can be suppressed. Furthermore, with the circuit arrangement using the detection unit for detecting an output voltage from the solar cell 1 as in the third embodiment, the operation history of the power generation system can be determined, and hence more efficient control can be executed. Assume that a charging operation is inhibited because of overcharging during the daytime, and a load is connected while no power is generated by the solar cell as in the nighttime. In this case, inhibition of charging is automatically canceled. According to this procedure, charging of the accumulation unit can be started at dawn.

According to the third embodiment, the current detection resistor in the second embodiment can be omitted to obtain a more inexpensive charging control apparatus.

(Modification of Operation)

A modification of this operation aims at preventing chattering in a charging operation, and allowing a more effective charging operation.

Figure 7A:
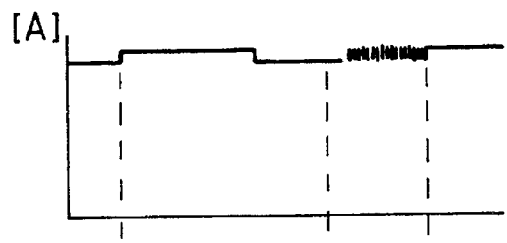
FIGS. 7A, 7B, and 7C are timing charts for explaining a chattering operation.
Figure 7B:
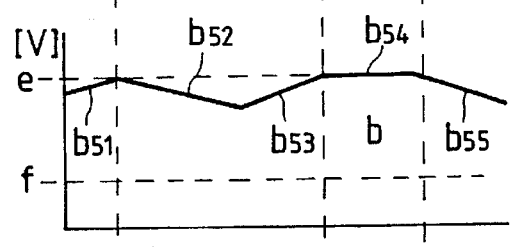
Figure 7C:
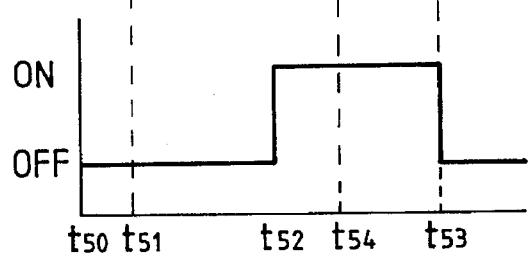

FIGS. 7A, 7B, and 7C are timing charts for explaining how chattering is caused. The timing charts in FIGS. 7A, 7B, and 7B respectively show the output current from the solar cell 1, the output voltage from the accumulation unit 4, and the connection between the output and the load. The overall arrangement and the reference symbols are similar to those in the first embodiment shown in FIGS. 2A, 2B, and 2C. (However, this modification can also be applied to the second embodiment, and a description thereof will be made mainly in comparison with FIGS. 2A, 2B, and 2C.)

As for the symbols t at the respective timings along the abscissa in FIG. 7, charging start time $t_{50}$, charging stop time $t_{51}$, connection time $t_{52}$ of the load 6, and disconnection time $t_{53}$ of the load 6 respectively correspond to time $t_{10}$ to $t_{13}$ in FIG. 2.

Referring to the timing chart in FIG. 7A showing the output current from the solar cell 1, chattering is caused in the interval between time $t_{54}$ and time $t_{53}$. In this case, "chattering" means repetition of charging and charging stop operations at short intervals. In the present invention, such a state is caused by an opening/closing operation of the overcharging prevention short-circuit switch 7.

This chattering is an abnormal phenomenon caused, for example, when the accumulation unit 4 is overcharged while the internal impedance increases, and the capacity of the accumulation unit 4 is very small as compared with the amount of power generated. In such a state, the terminal voltage of the accumulation unit temporarily exhibits a great drop in a period of transition from a charging state to a charging stop state. When this voltage drops to the charging start voltage f, the charging stop state changes to a charging start state. After a charging state is set, the voltage reaches the charging stop voltage e, and the charging operation is immediately stopped. When this state repeats, chattering occurs. If the switch for causing such a chattering phenomenon is of a mechanical type, a deterioration in reliability occurs mainly in terms of service life, or an operation error may occur in an associated device.

Figure 8A:
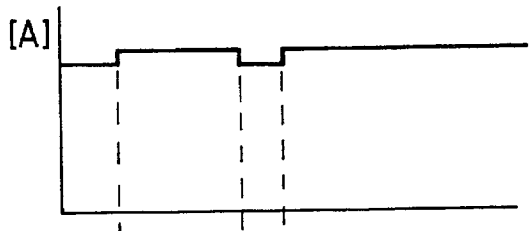
FIGS. 8A, 8B, and 8C are timing charts for explaining the operation of the present invention which is performed to prevent chattering.
Figure 8B:
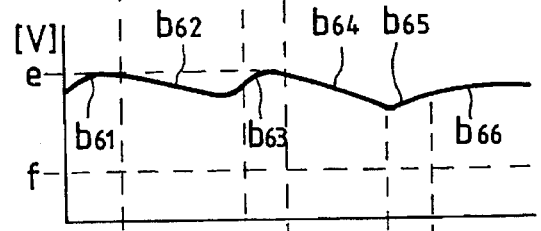
Figure 8C:
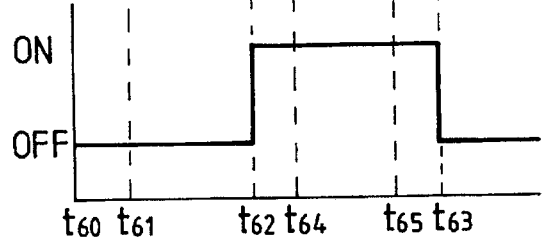
Figure 9:
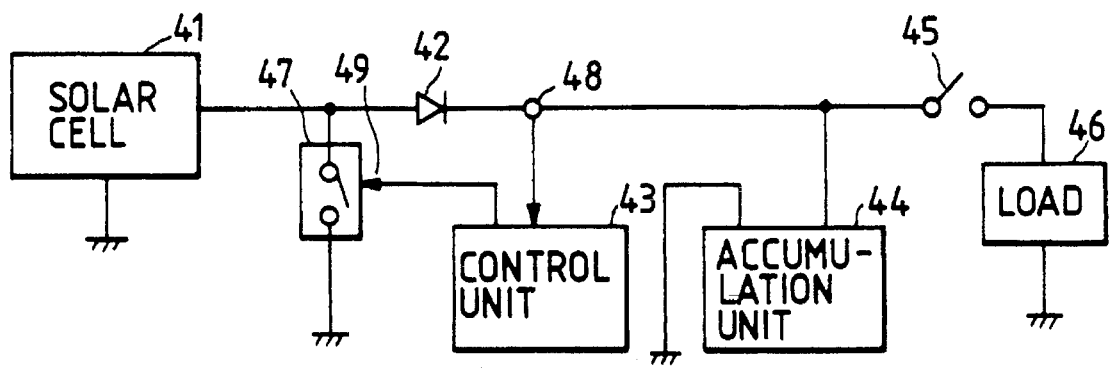
FIG. 9 is a schematic view showing the circuit arrangement of a charging control apparatus to be compared with the present invention.

FIGS. 8A, 8B, and 8C are timing charts for explaining an operation of the present invention which is designed to suppress the occurrence of this chattering phenomenon. A charging operation in a non-load state is the same as that in FIGS. 2A, 2B, and 2C. After time $t_{62}$ at which a load is connected, an output current from the solar cell 1 passes through the diode 2 to be output to the accumulation unit 4 and the load 6. Discharging to the load 6 is performed while the solar cell 1 and the accumulation unit 4 are connected in parallel. In this case, if the consumption power of the load 6 is very small, a terminal voltage $b_{63}$ of the accumulation unit 4 rises as in the case wherein only discharging of the accumulation unit 4 is resumed.

When the terminal voltage of the accumulation unit 4 rises to the predetermined voltage e, at which the charging operation must be terminated again, at time $t_{64}$ owing to the resumption of charging, the control unit 3 outputs a short-circuit control signal 9 to close the overcharging prevention short-circuit switch 7. In this case, the control unit 3 receives a signal output from the detection unit 11 to detect the current supplied to the load 6. Upon reception of an output signal from the detection unit 10, the control unit 3 detects the current discharged to the ground via the short-circuit switch 7. The control unit 3 compares these current values. If the current value in the load 6 is very small, the signal which is output from the control unit 3 to close the short-circuit switch 7 is kept unchanged, and a terminal voltage $b_{64}$ of the accumulation unit 4 drops.

When the load amount increases in the interval between time $t_{64}$ and time $t_{65}$, the terminal voltage $b_{64}$ of the accumulation unit 4 begins to drop. At this time, the control unit 3 receives a signal output from the current detection unit 11 to detect the current supplied to the load 6. In addition, upon reception of an output signal from the detection unit 10, the control unit 3 detects the current discharged to the ground via the short-circuit switch 7. The control unit 3 compares these current values. If the current value in the load 6 is larger than the current in the short-circuit switch 7, the control unit 3 outputs a short-circuit control signal 9 to switch the short-circuit switch 7 to an open state. With this switching of the short-circuit switch 7, discharging of the output from the solar cell 1 to the ground, which has been continued till time $t_{65}$, is stopped.

After time $t_{65}$, the output current from the solar cell 1 passes through the diode 2 to be output to the accumulation unit 4 and the load 6. As a result, discharging to the load 6 is performed while the solar cell 1 and the accumulation unit 4 are connected in parallel. In this case, discharging of the accumulation unit 4 is inhibited, and a terminal voltage $b_{65}$ of the accumulation unit 4 undergoes no drop.

At time $t_{63}$, the connection switch 5 is opened to disconnect the load 6. Since charging is continued, a terminal voltage $b_{66}$ of the accumulation unit 4 further rises. The terminal voltage $b_{66}$ of the accumulation unit 4 is detected by the detection unit 8, and charging is continued until the terminal voltage reaches the predetermined voltage e at which charging is inhibited.

According to the above procedure, the conditions for starting a charging operation are based on not only the terminal voltage of the accumulation unit but also the magnitude of a current value. Since a charging operation based on an apparent voltage value is not performed, the occurrence of chattering is suppressed.

The above embodiments are preferred embodiments of the present invention. However, the present invention is not limited to these embodiments. Various changes and modifications can be made within the spirit and scope of the invention. For example, in the above embodiments, when charging of the accumulation unit is stopped, power generated by the solar cell is discharged to the ground. However, another procedure may be employed. For example, the output circuit of the solar cell may be disconnected in front of the overcharging prevention diode.

The detection unit for detecting a short-circuited state of an output current from the solar cell and the detection unit for detecting the connected/non-connected state of the load may be arbitrarily combined with the different methods in the respective embodiments, and combinations of such units and methods are not limited to those in the embodiments.

As is apparent from the above description, in the charging control method and apparatus for the power generation system according to the present invention, the terminal voltage of the accumulation unit and the presence/absence of an output from the output terminal to the load are detected, and charging of the accumulation unit is controlled on the basis of the resultant detection signals. That is, both the terminal voltage of the accumulation unit and the connected/non-connected state of the load are detected, and charging of the accumulation unit is controlled by using the resultant detection signals. Therefore, power generated by the power generation unit can be used more effectively, and charging of the accumulation unit can be controlled with higher precision. According to this arrangement, the discharging depth of the accumulation unit can be reduced to prolong the service life.

In addition, charging of the accumulation unit, which is performed by power generated by the power generation unit depending on the presence/absence of an output to the load, can be controlled under different conditions. This realizes more efficient control of the power generation system, and allows more effective use of power generated by the power generation unit.

What is claimed is:

1. A charging control apparatus provided with a power generation means, an accumulation means and a load, wherein the accumulation means and the load are connected in parallel with the power generation means, comprising:

first switch means for opening and closing a path between the power generation means and the accumulation means;

second switch means for opening and closing a path between the power generation means and the load;

first detection means for detecting an output from the power generation means;

second detection means for detecting an output from the accumulation means;

third detection means for detecting open and closed states between the power generation means and the load;

wherein the first switch means is set in a closed state based on an output signal from the second detecting means so that the accumulation means is charged until a time of a predetermined state determined as an overcharge, and is then set in an open state upon reaching the predetermined charging state, and the first switch means is controlled in the closed state, based on the detections by the first and third detection means when the output from the first detection means is detected and the third detection means detects a closed state of the second switch means.

2. An apparatus according to claim 1, wherein said power generation means is a device including a solar cell.

3. An apparatus according to claim 1, wherein the first switch means includes means for connecting the power generation means to a ground in an open state between the power generation means and the accumulation means.

4. A charging control method for connecting an accumulation means and a load in series with a power generation means to charge the accumulation means with an output from the power generation means, comprising the steps of:

arranging a first switch means for opening and closing a path between the power generation means and the power accumulation means, and a second switch means for opening and closing a path between the power generation means and the load; and arranging a first detection means for detecting an output from the power generation means, and second detection means for detecting an output from the accumulation means, and third detection means for detecting open and closed states between the power generation means and the load, wherein the accumulation means is charged until a predetermined charging state determined as an overcharge by closing the first switch means based on an output signal from the second detection means, and, upon reaching the predetermined charging state, the first switch means opens to stop the charging, and the charging is restarted by the close of the first switch means based on detections by the first and third detection means when the output from the first detection means is detected and the third detection means detects the closed state of the second switch means.

5. A method according to claim 4, wherein the power generation means is a device including a photoelectric conversion element.

6. A method according to claim 5, wherein said photoelectric conversion element is a device including a solar cell.

7. A method according to claim 4, wherein the first switch means connects the power generation means to a ground in an open state between the power generation means and the accumulation means.

* * * * *

UNITED STATES PATENT AND TRADEMARK OFFICE
CERTIFICATE OF CORRECTION

PATENT NO. : 5,621,300
DATED : April 15, 1997
INVENTOR(S) : SATO, et al.

It is certified that error appears in the above-indentified patent and that said Letters Patent is hereby corrected as shown below:

Column 3

Line 39, "and" should read --and 2C--.

Column 4

Line 57, "(no" should read --(not--.

Column 5

Line 36, "10a, 10b and 10c" should read --2A, 2B and 2C--.

Column 6

Line 29, "power" should read --of power--.

UNITED STATES PATENT AND TRADEMARK OFFICE
CERTIFICATE OF CORRECTION

Page 2 of 2

PATENT NO. : 5,621,300
DATED : April 15, 1997
INVENTOR(S) : SATO, et al.

It is certified that error appears in the above-identified patent and that said Letters Patent is hereby corrected as shown below:

Column 8

Line 4, "of" should be deleted.

Line 39, "7B" (second occurrence) should read --7C--.

Signed and Sealed this

Eighteenth Day of November 1997

Attest:

BRUCE LEHMAN

*Attesting Officer*  *Commissioner of Patents and Trademarks*